(12) United States Patent
Ferguson

(10) Patent No.: US 12,676,014 B2
(45) Date of Patent: Jul. 7, 2026

(54) AUTOMATIC IMAGE QUALITY AND FEATURE CLASSIFICATION METHOD

(71) Applicant: ARACELI BIOSCIENCES INC., Tigard, OR (US)

(72) Inventor: Kevin Ferguson, Beaverton, OR (US)

(73) Assignee: ARACELI BIOSCIENCES INC., Tigard, OR (US)

( * ) Notice: Subject to any disclaimer, the term of this patent is extended or adjusted under 35 U.S.C. 154(b) by 610 days.

(21) Appl. No.: 18/305,999

(22) Filed: Apr. 24, 2023

(65) Prior Publication Data

US 2023/0368549 A1 Nov. 16, 2023

Related U.S. Application Data

(60) Provisional application No. 63/364,708, filed on May 13, 2022.

(51) Int. Cl.
| | |
|---|---|
| *G06K 9/00* | (2022.01) |
| *G06V 10/74* | (2022.01) |
| *G06V 20/69* | (2022.01) |

(52) U.S. Cl.
CPC .......... *G06V 20/698* (2022.01); *G06V 10/761* (2022.01)

(58) Field of Classification Search
None
See application file for complete search history.

(56) References Cited

U.S. PATENT DOCUMENTS

| | | |
|---|---|---|
| 8,963,998 B2 | 2/2015 | Ferguson |
| 9,392,267 B2 | 7/2016 | Ferguson |

OTHER PUBLICATIONS

Kaczmar-Michalska et al., "Image quality measurement and denoising using Fourier Ring Correlations" (Year: 2022).*
Paul, P. et al., "Automatic quality assessment for fluorescence microscopy images," Proceedings of the 2008 8th IEEE International Conference on BioInformatics and BioEngineering, Oct. 8, 2008, Athens, Greece, 6 pages.
Everingham, M. et al., "The PASCAL Visual Object Classes Challenge 2012 (VOC2012) Development Kit," Pascal Voc Challenge performance evaluation and download server Website, Available Online at http://host.robots.px.ac.uk/pascal/VOC/pubs/everingham15.pdf, May 18, 2012, 32 pages.
Ahmed, F. et al., "Optimizing Expected Intersection-Over-Union with Candidate-Constrained CRFs," Proceedings of the 2015 IEEE International Conference on Computer Vision (ICCV), Dec. 7, 2013, Santiago, Chile, 9 pages.
Chalapathy, R. et al., "Deep Learning for Anomaly Detection: A Survey," arXiv Cornell University Website, Available Online at https://arxiv.org/pdf/1901.03407.pdf, Available as Early as Jan. 23, 2019, 50 pages.

(Continued)

*Primary Examiner* — Sj Park
(74) *Attorney, Agent, or Firm* — McCoy Russell LLP

(57) ABSTRACT

Methods and systems are provided herein for automatic image assessment, such as the assessment of image quality or feature classification/quantification, by comparing two or more images. In one example, a method may include outputting a metric indicating a degree of similarity between a test image and a reference image for a selected characteristic based on an intersection over union calculation applied to spatial frequency domain transforms of the test image and the reference image.

17 Claims, 9 Drawing Sheets

(56)     References Cited

OTHER PUBLICATIONS

Koho, S. et al., "Fourier ring correlation simplifies image restoration in fluorescence microscopy," Nature Communications, vol. 10, No. 3103, Jul. 15, 2019, 9 pages.

"Recommendation Itu-R BT.500-14: Methodologies for the subjective assessment of the quality of television images," ITU Website, Available Online at https://www.itu.int/dms_pubrec/itu-r/rec/bt/R-REC-BT.500-14-201910-I!! PDF-E.pdf, Oct. 2019, 102 pages.

Lo, C. et al., "MOSNet: Deep Learning-based Objective Assessment for Voice Conversion," arXiv Cornell University Website, Available Online at https://arxiv.org/pdf/1904.08352.pdf, Available as Early as Jul. 14, 2021, 5 pages.

Lu, Z. et al., "Deep Noise Suppression Maximizing Non-Differentiable PESQ Mediated by a Non-Intrusive PESQNet," arXiv Cornell University Website, Available Online at https://arxiv.org/pdf/2111.03847.pdf, Available as Early as Nov. 6, 2021, 13 pages.

* cited by examiner

AUTOMATIC IMAGE QUALITY AND FEATURE CLASSIFICATION METHOD

CROSS REFERENCE TO RELATED APPLICATION

The present application claims priority to U.S. Provisional Application No. 63/364,708, entitled "AUTOMATIC IMAGE QUALITY AND FEATURE CLASSIFICATION METHOD", and filed on May 13, 2022. The entire contents of the above-listed application are hereby incorporated by reference for all purposes.

FIELD

Embodiments of the subject matter disclosed herein relate generally to image quality and feature assessment.

BACKGROUND/SUMMARY

Various imaging technologies, such as microscopy techniques, may be used to acquire digital images of cells, biological structures, or other materials. A real-time assessment of image quality may be used to determine if there was an issue with image acquisition, such as a focus issue (e.g., blur), illumination bleed-through, scatter, noise in the optical path (e.g., due to dirt or other debris), and/or unsolvable convolution issues. In some examples, subjective image quality metrics may be used as a reference for correlation and error metrics for accuracy verification. However, obtaining such assessments may be time consuming, relatively expensive, and may be hindered in applications such as fluorescence microscopy for bioassays, where exact references for comparison may not be available.

One approach for image quality assessment for bioassays is a proxy metric statistics approach, such as a two-dimensional (2D) Fourier ring weighted histogram correlation (FRC) approach. While the FRC approach and similar methods have been used to determine relative blur and some other image quality correlate, they do not enable overall quality assessments relative to a reference image. Instead, the FRC approach generally distinguishes between very good image quality and very bad image quality, without fine distinctions between very good and very bad.

The inventors herein have recognized the above-mentioned issues and have engineered a way to at least partially address them. In one example, a method may include outputting a metric indicating a degree of similarity between a test image and a reference image for a selected characteristic based on an intersection over union calculation applied to spatial frequency domain transforms of the test image and the reference image. The metric may be referred to herein as a Fourier ring intersection over union (FRIOU) metric. In this way, real-time evaluations of the degree of similarity between the test image and the reference image may be determined for image quality or other image features, particularly cell counts and other cellular changes that may be interrogated in bioassays.

Advantages that may be realized in practicing the above-described method include increased correlations (both Pearson's linear coefficient and Spearman's rank order coefficient) with subjective quality ratings compared with the FRC approach, simpler and more computationally efficient processing of the image metric compared to the FRC approach, straightforward applicability to a large collection of images, and a high degree of sensitivity to image quality. Further, the FRIOU metric may be used to measure a degree of similarity and/or for classifying features, which may increase its applicability to cell-based bioassays compared with, for example, the FRC approach and deep neural network approaches.

The above advantages and other advantages, and features of the present description will be readily apparent from the following detailed description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 8 shows a set of images of cells having differing image qualities.

DETAILED DESCRIPTION

Figure 8:
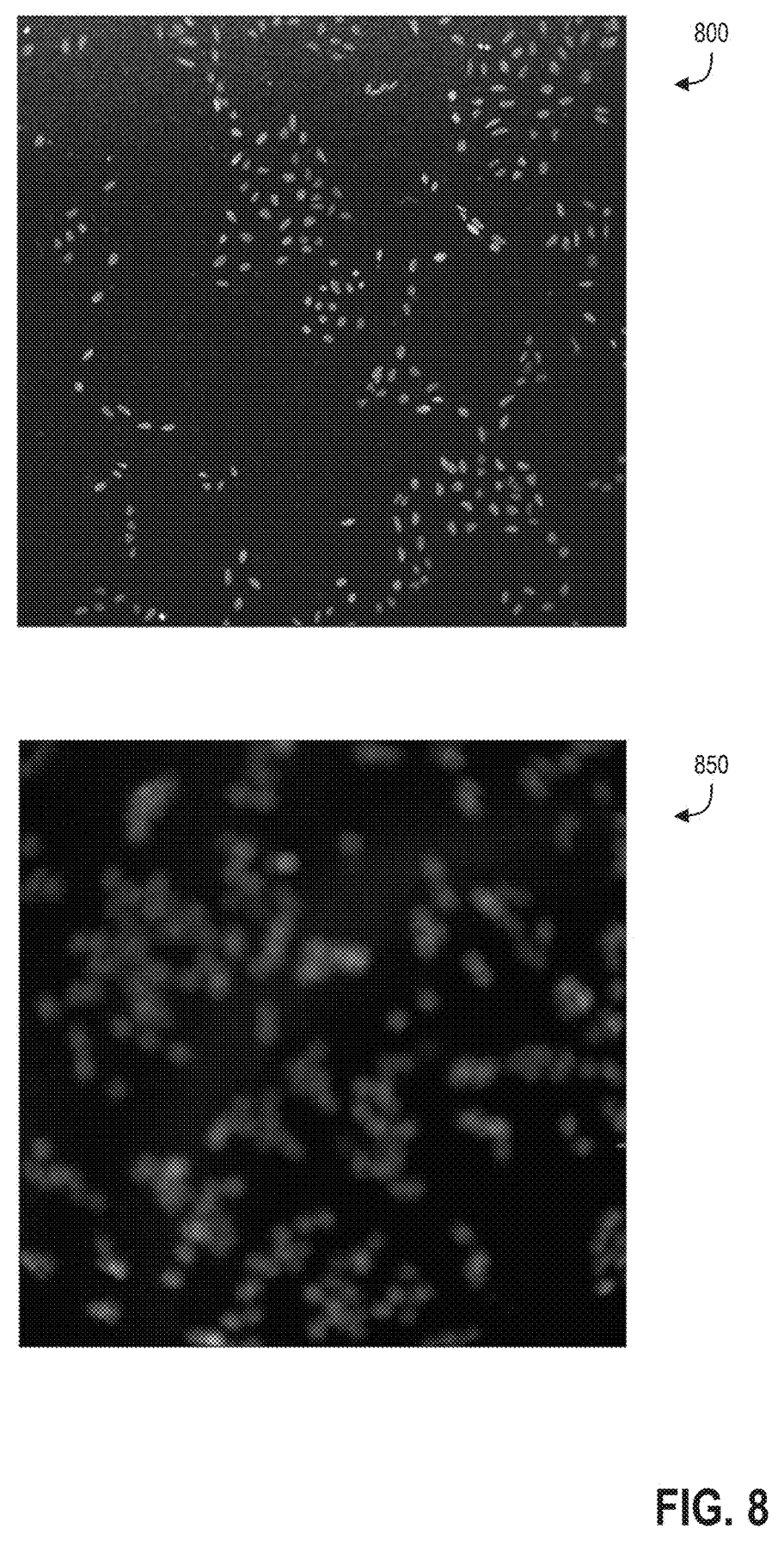
Figure 9:
FIG. 9 shows a graph comparing cell counts using different image-based cell counting methods relative to the corresponding FRIOU metric for each image.

The present description is related to image quality assessments of images obtained via optical imaging techniques. The image quality assessment may be performed using a computing system, such as the computing system shown in FIG. 1. The computing system may employ one or more methods, such as the methods shown in FIGS. 3-5, to assess the image quality of images using a Fourier ring intersection over union (FRIOU) metric, with an example of the Fourier ring shown in FIG. 6. FIG. 7 additionally shows a method that may be used to classify cells within images using the FRIOU metric. FIG. 8 shows a set of images of differing image qualities that may each be evaluated by determining the FRIOU metric, and FIG. 9 shows cell counts within images as determined by two different methods, one of which is more robust to image degradation than the others, relative to the FRIOU metric of the image.

Figure 1:
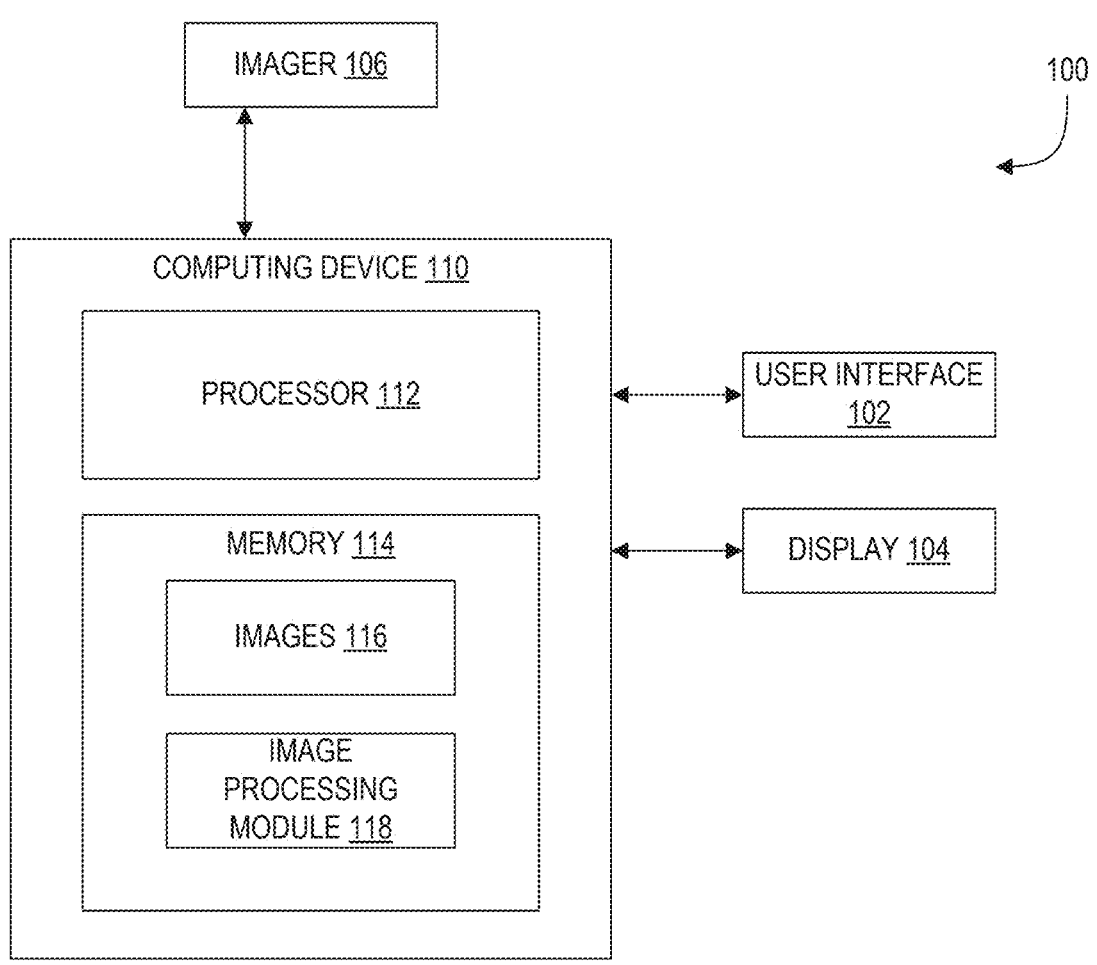
FIG. 1 shows a diagram of a computing device.

Turning now to the figures, FIG. 1 shows an exemplary computing system 100, according to an embodiment. The computing system 100 includes a computing device 110, which further includes a processor 112 and a memory 114. The processor 112 may comprise one or more computational components usable for executing machine-readable instructions. For example, the processor 112 may comprise a central processing unit (CPU) or may include, for example a graphics processing unit (GPU). The processor 112 may be positioned within the computing device 110 or may be communicatively coupled to the computing device 110 via a suitable remote connection.

The memory 114 may comprise one or more types of computer-readable media, including volatile and/or non-volatile memory. The volatile memory may comprise, for example, random-access memory (RAM), and the non-volatile memory may comprise read-only memory (ROM). The memory 114 may include one or more hard disk drive(s) (HDDs), solid state drives (SSDs), flash memory, and the like. The memory 114 is usable to store machine-readable instructions, which may be executed by the processor 112. The memory 114 is further configured to store images 116, which may comprise digital images captured or created using a variety of techniques, including digital imaging, digital illustration, and more. The images 116 may further include one or more reference images, which may be used as a comparison to determine an image metric, as will be further described herein. For example, the image metric may be one or more of an image quality score and a similarity score.

At least a portion of the images 116 may be acquired via an imager 106. The imager 106 may be one or more of a microscope (e.g., a light microscope, a fluorescence microscope), a multi-well plate imager, and another type of bioassay imager, for example. The imager 106 may include one or more light sources, including broad and/or narrow spectrum light sources. Examples of broad spectrum light sources include light sources that emit light over a wide wavelength range, such as lamps (e.g., mercury lamps, halogen lamps) that emit light spanning the ultra-violet (UV) and visible ranges. Examples of narrow spectrum light sources include light sources that emit light from a narrow wavelength range or wavelength band, such as light-emitting diodes (LEDs) and lasers. The imager 106 may further include at least one image sensor, such as a charge-coupled device (CCD), an electron multiplying CCD (EMCCD), an active pixel sensor (e.g., a complementary metal-oxide-semiconductor, or CMOS, sensor), or another type of sensor that detects light in a location-specific manner, such as in an array-based fashion. Additionally, the imager 106 may include one or more optical coupling devices (e.g., lenses and mirrors), filters, beam splitters, and the like that may be used to direct light of a desired wavelength or wavelength range to a sample being imaged and receive light transmitted by, reflected by, or emitted by (e.g., depending on the imaging modality) the sample at the image sensor(s).

The memory 114 further includes an image processing module 118, which comprises machine-readable instructions that may be executed by the processor 112 to compute one or more image metrics of the images 116. The image processing module 118 thus contains machine-readable instructions for manipulation of digital images (e.g., the images 116), such as instructions to perform a Fourier transform and determine an intersection over union metric to a pair of test and reference image(s). For example, the machine-readable instructions stored in the image processing module 118 may correspond to one or more routines, examples of which are provided with respect to FIGS. 2-5 and 7.

The computing system 100 further include a user interface 102, which may comprise one or more peripherals and/or input devices, including, but not limited to, a keyboard, a mouse, a touchpad, or virtually any other input device technology that is communicatively coupled to the computing device 110. The user interface 102 may enable a user interact with the computing device 110, such as to select one or more images to evaluate, to select one or more parameters of the image metric, and so forth.

The computing system 100 further includes a display device 104, which may be configured to display results of image metrics, display the images themselves, and display possible parameter options and selections related to the computation of image metrics, including one or more cutoff frequencies, one or more reference images, and one or more histogram bin widths, for example. The user may select or otherwise input parameters via the user interface 102 based on options displayed via the display device 104.

Figure 2:
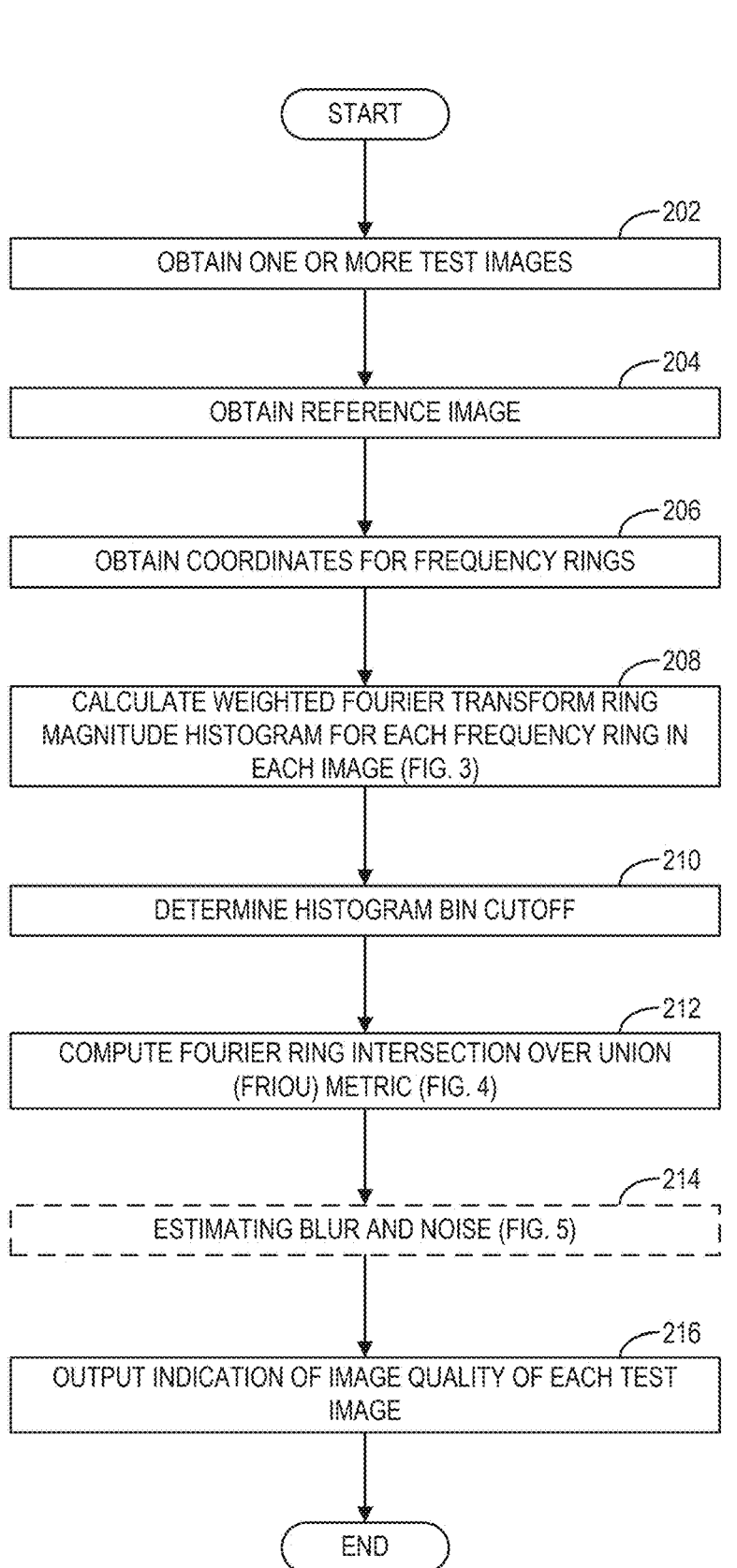
FIG. 2 shows a high-level flow chart of an example method for computing a Fourier ring intersection over union (FRIOU) and blur and noise for an image compared to a reference image.

FIG. 2 shows a method 200 for computing image quality metrics, including a Fourier ring intersection over union (FRIOU) metric, according to an embodiment. The method 200 and the rest of the methods included herein may be executed by a processor of a computing system, such as the processor 112 of the computing system 100 of FIG. 1, according to instructions stored in a non-transitory memory of the computing system (e.g., within the image processing module 118 of the memory 114 of FIG. 1).

At 202, the method 200 includes obtaining one or more test images. The test images may comprise digital images acquired or generated via an imaging system, such as the imager 106 of FIG. 1. For example, the test images may be images of one or more bioassays obtained via fluorescence microscopy, bright-field microscopy, or other imaging techniques. As an example, each bioassay may comprise a multi-well plate, each well of the multi-well plate holding a plurality of cells subjected to a same or different treatment condition or a control, where no treatment is provided. The treatment condition may be, for example, treatment with varying concentrations of a drug or other compound, treated with an infectious agent (e.g., a viral or bacterial infection), and the like. In some examples, the cells may be treated with one or more fluorophores (e.g., fluorescent dyes) for visualization via fluorescence microscopy and other fluorescence-based imaging techniques. When multiple fluorescent dyes are used, each fluorescent dye may be spectrally distinct from the other fluorescent dyes (e.g., may have non-overlapping excitation and emission maxima) and may target different cellular structures, compartments, or processes. As used herein, the term "test image" denotes an image to be evaluated against a reference image to determine a degree of similarity with the reference image.

Each of the images obtained may have the same resolution (e.g., have the same numbers of pixels along height and width dimensions). Grayscale images will be described herein, such that each pixel within each digital image is represented through a brightness value. However, it may be understood that the image metric disclosed herein may be applied to multi-channel or color images. For example, a multi-channel image may be a composite of multiple images (e.g., multiple grayscale images) obtained in spectrally distinct imaging channels of the imaging system. In one example, a three-color image may include a first image obtained via first imaging channel (e.g., a red channel), a second image obtained via a second imaging channel (e.g., a blue channel), and a third image obtained via a third imaging channel (e.g., a green channel). The FRIOU metric may be evaluated for each channel or for the composite image.

At 204, the method 200 includes obtaining the reference image. The reference image may contain a desired spatial frequency content and/or one or more desired features, such as image quality features (e.g., focus, low noise). In some examples, the reference image may have the same resolution as each of the test images obtained at 202. The reference image may be a pre-determined reference image that is manually selected by a user or selected using an algorithm, such as a machine learning-based algorithm that identifies a most appropriate reference images from a plurality of candidate reference images. For example, the user may select a desired quality, and the algorithm may identify the reference image that is the closest match for the desired quality from the plurality of candidate reference images. As another example, the algorithm may compare the plurality of reference images to each other and select the reference image that is most similar to the others (e.g., having the highest FRIOU metrics when compared to each other candidate reference image). For example, the method 200 may include calculating FRIOU metrics for the candidate reference images according to the methods described herein with particular respect to FIGS. 2 and 4 prior to using the reference image against non-reference test images.

At 206, the method 200 includes obtaining coordinates for frequency rings. Frequency rings, as described herein, are collections of data points within the spatial frequency domain that share a common spatial frequency. Obtaining sets of coordinates for each frequency ring beforehand allows for a processing time for determining the FRIOU metric to be reduced because computing sets of coordinates for each frequency ring may be computationally difficult. Because the test images and the reference image may have the same resolution, the same sets of coordinates may be usable for all images. Further, histogram bins may be defined. A radius of the frequency domain, which represents the frequency of each point within the frequency ring, is specified according to the bin index, and there may be multiple radii integrated into one histogram bin. The bin index, b, is used to address the histogram. A parameter $b_0$ is a first bin number used and it provides a histogram bin cutoff frequency for high pass filtering, as will be elaborated below at 210.

Figure 6:
FIG. 6 shows a diagram of a spatial frequency-space image including a frequency ring.
Figure 6:
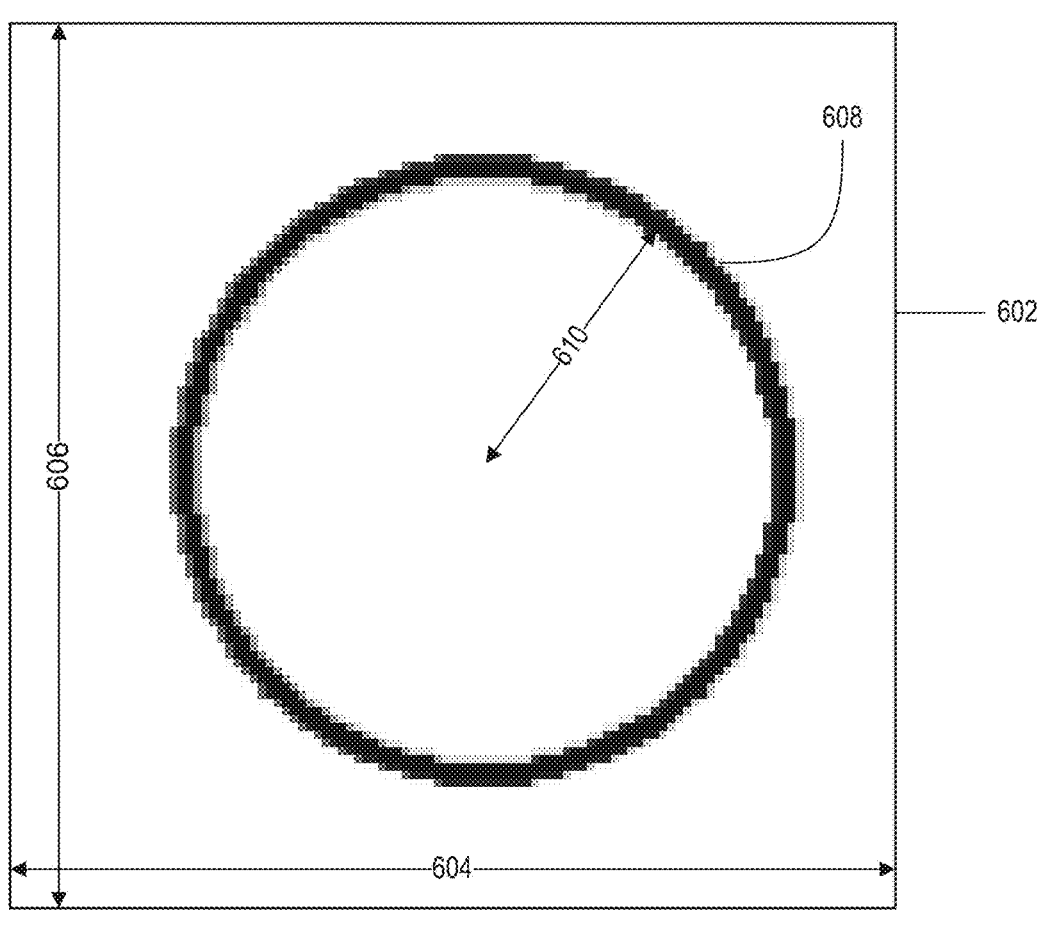
Figure 7:
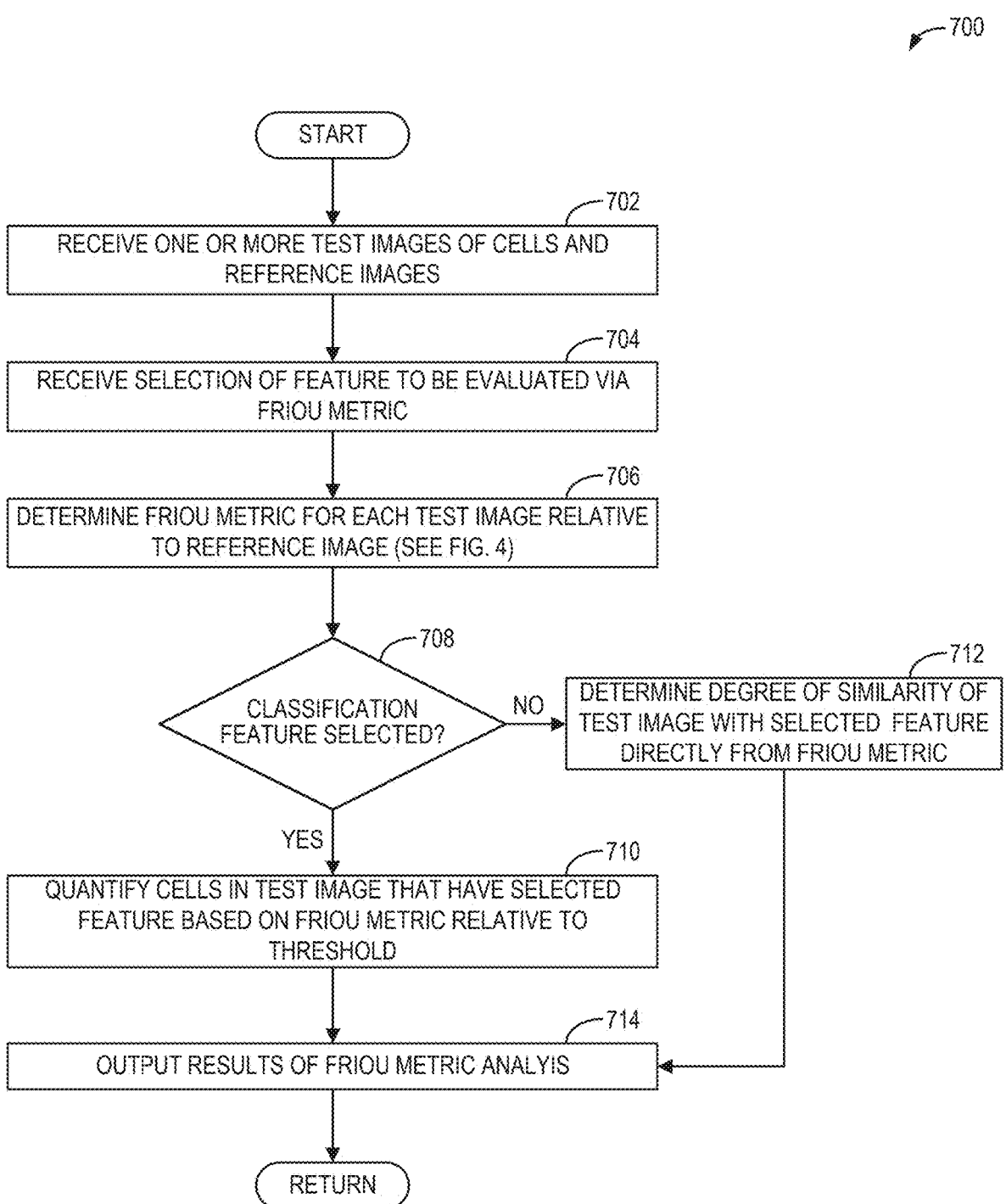
FIG. 7 shows a flow-chart of an example method for classifying cells within an image based on the FRIOU metric.

Turning briefly to FIG. 6, a graphic 600 of a spatial frequency domain image 602 is shown. The spatial frequency domain image 602 includes spatial frequency image content having a width 604 and a height 606. The spatial frequency domain image 602 includes a frequency ring 608, which has a radius 610 proportional to the spatial frequency. All points within the frequency ring 608 have approximately the same spatial frequency, with some tolerance for quantization errors, as shown by the pixilation of the frequency ring 608.

Returning to FIG. 2, at 208, the method 200 includes calculating a weighted Fourier ring magnitude histogram (WFRMH) for each frequency ring in each image. As will be described in further detail with respect to FIG. 3, computation of the WFRMH for each frequency ring comprises evaluating a two-dimensional (2D) fast Fourier transform (FFT) of the image, computing histograms for each frequency ring within the 2D FFT, and normalizing each histogram. Nominally, all radii are used to integrate the 2D FFT magnitude coefficients. Histograms may be chosen such that for each frequency, bins are of the same width and number. As will be described in further detail below with respect to FIG. 3, histograms of different images may be compared.

At 210, the method 200 includes determining the histogram bin cutoff. The histogram bin cutoff is a histogram bin below which the histogram is not to be compared, analogous to a high pass filter frequency cutoff. In some examples, the histogram bin cutoff may have a pre-determined (e.g., fixed) frequency that is selected for a given application. In other examples, the histogram bin cutoff may be calculated to optimize performance metrics. In one example, the cutoff value is determined by determining the peak of spectral content within a frequency ring histogram (e.g., the largest bin) and adding a small integer, thereby resulting in an index corresponding to a slightly higher histogram bin. As an illustrative example, for typical human cells having nuclei stained for fluorescence microscopy, nuclei diameters tend to range from about 1 to 10 micrometers (μm). Therefore, the histogram bin cutoff for 4400×4400 pixel images with 1.1 millimeter width may be 10 so that the lowest bins are optimized relative to the cell nuclei. The lower frequency information is less useful than the spectral information corresponding to the nuclei (e.g., much smaller detail), and so the histogram bin cutoff may be used to filter out this lower frequency information. Determination of the cutoff value allows for a high-pass filter to be applied to each image (e.g., each test image and the reference image) during the computation of the FRIOU, as explained in further detail below.

At 212, the method 200 includes computing the FRIOU metric. Computing the FRIOU metric includes comparing the weighted Fourier magnitude histograms for each image. Comparisons are further performed based on a high-pass filtered defined using the histogram bin cutoff determined at 210. Details about determining the FRIOU metric will be described below with respect to FIG. 4. In particular, the FRIOU metric of each test image may represent a degree of similarity between the test image and the reference, with the degree of similarity ranging from 0.0 (no similarity) to 1.0 (maximum similarity). When the reference image represents a high quality (e.g., maximum quality) images, test images having a high FRIOU metric (e.g., higher than a pre-determined non-zero FRIOU metric threshold, such as higher than 0.6) may be determined to have high image quality. As will be described with respect to FIG. 7, the FRIOU metric may also be used to determine degrees of similarity between test images and the reference images for features other than image quality. For example, the feature may be used for cell classification, cell type counting, or to quantify a relative change cell morphology or cell death with respect to treatment concentration.

At 214, the method 200 optionally includes estimating blur and noise. Blur and noise may be estimated according to the method of FIG. 5, as will be described below. Thus, the blur and noise may be estimated in addition to the FRIOU metric and may be combined with the FRIOU metric as an overall assessment of image quality. In other examples, the FRIOU metric alone may be used to assess image quality.

At 216, the method 200 includes outputting an indication of the image quality for each test image. In some examples, the indication of the image quality may be the FRIOU metric. In other examples, the indication of the image quality may be determined from the FRIOU metric alone or in combination with the blur and noise estimates. For example, the indication of the image quality may be assigned according to pre-determined FRIOU metric ranges corresponding to different qualifiers (e.g., bad, low, acceptable, good, great, excellent). As an example, images in a lowest pre-determined FRIOU metric range may be indicated as having bad image quality, and images in a highest pre-determined FRIOU metric range may be indicated as having excellent image quality. The indication may be output via a display device, such as the display device 104 of FIG. 1. The indication may additionally or alternatively be output as a tag or other type of data stored alongside or associated with the corresponding test image. The method 200 may then end.

Figure 3:
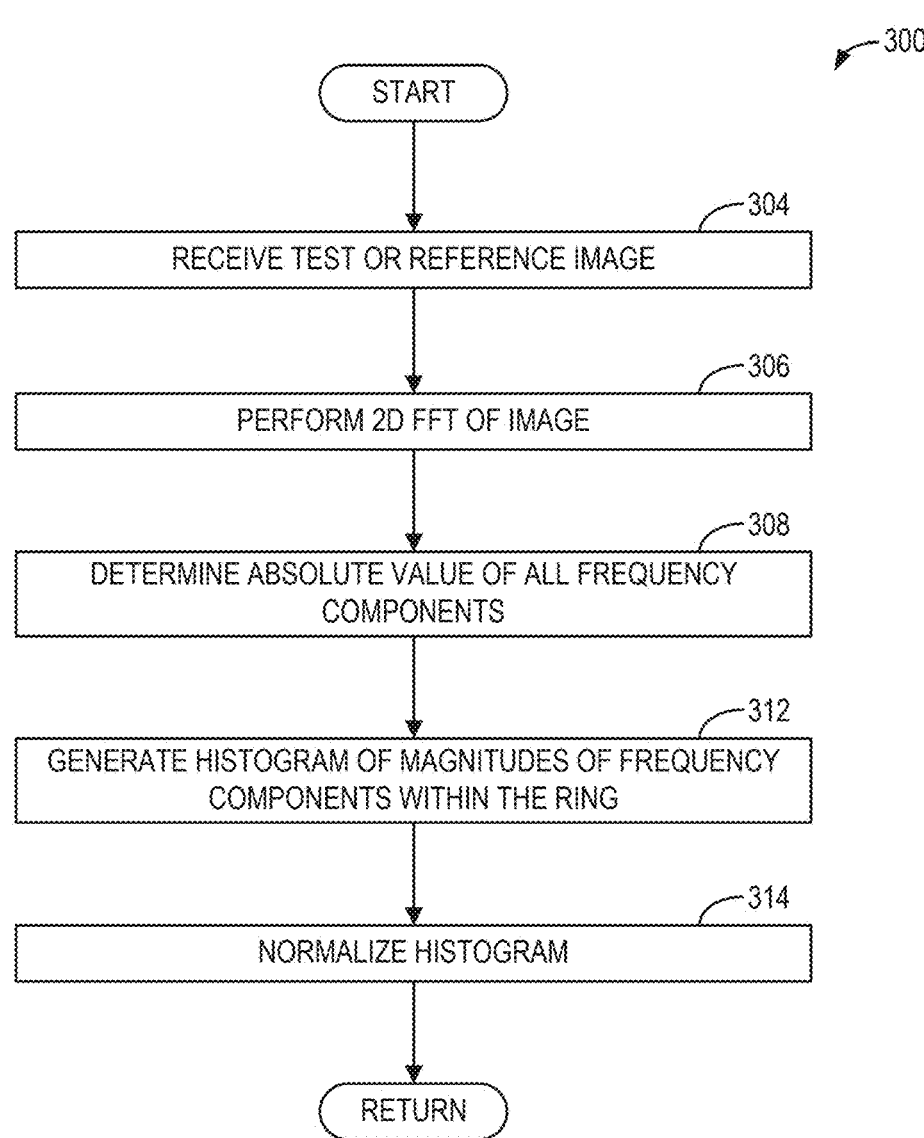
FIG. 3 shows a flow-chart of an example method for generating a weighted Fourier magnitude histogram of an image.

FIG. 3 shows a method 300 for computing a set of frequency domain magnitude histograms for each frequency ring within an image. In one embodiment, the method 300 is performed as a part of the method 200 of FIG. 2 (e.g., at 208).

At 304, the method 300 includes receiving a test or reference image. In some examples, the method 300 may be executed simultaneously or sequentially for a plurality of images, including one or more test images and candidate reference images, as obtained at 202 and 204 of the method 200.

At 306, the method 300 includes performing a 2D FFT of the image. The 2D FFT of the image represents the image in the spatial frequency domain and includes the same number of values as the number of pixels within the original image. Each value within the spatial frequency domain is represented by a complex number, e.g., a number with real and imaginary components. For example, if the image is denoted X and the pixel located at row m and column n is represented by a brightness value $x_{mn}$, the FFT of the image X is a spatial frequency domain image $\hat{X}$, whose values $\widehat{x_{uv}}$ are complex numbers given by the equation:

$$\widehat{x_{uv}} = \sum_{m,n} x_{mn} e^{-i(um+vn)}$$

where the above sum is evaluated over all pixels within the digital image, the value e is Euler's number, and i is the imaginary unit, satisfying $i^2=-1$. Each value $\widehat{x_{uv}}$ is a frequency component of the spatial frequency domain image $\hat{X}$. The above equation is known as the discrete Fourier transform (DFT). It should be appreciated that, in general, the DFT is not usually evaluated using the definition itself, but through the use of one or more optimizations. The optimizations simplify the evaluation of the DFT using computer hardware and comprise the FFT. In practice, the FFT is used to evaluate the DFT of each image.

At 308, the method 300 includes determining the absolute value of all frequency components. Each of the frequency components, as described above, is represented by a complex number, with a real component and an imaginary component. That is, each frequency component $\widehat{x_{uv}}$ may be written as $\widehat{x_{uv}} = a_{uv} + b_{uv}i$, where both $a_{uv}$ (the real component) and $b_{uv}$ (the imaginary component) are numbers. The magnitude $\widehat{x_{uv}}$ of $\widehat{x_{uv}}$ is defined as $$|\widehat{x_{uv}}| = \sqrt{a_{uv}^2 + b_{uv}^2} .$$

The magnitude of each frequency component is also a real number and is always non-negative.

The spatial frequency $f_{uv}$ of the spatial frequency component $\widehat{x_{uv}}$ is given by $f_{uv}=\sqrt{u^2+v^2}$. A frequency ring with spatial frequency $f$, as defined herein, may be described by a collection of indices $\{u, v: |f_{uv}-f| \le t\}$, where t is a threshold. Since each of the indices u and v are integers, each frequency ring may include a ring specified to approximately a circle, up to quantization errors. Frequency rings and thresholds may be chosen or obtained (e.g., at 206) such that each pixel u, v within the frequency domain image falls into exactly one frequency ring and each pixel within a given frequency ring has approximately the same frequency.

Computation of the magnitude of each frequency is advantageous for computational efficiency and non-sensitivity to the orientation of the image. In general, real numbers (e.g., the magnitudes of the frequency components) use fewer computational resources to compute. Changing the orientation of the image, such as by rotating the image by some amount, effectively multiplies each of the frequency components by a factor of $e^{i\theta}$, where $\theta$ is the angle of rotation. By taking the magnitude of each frequency component, any factors resulting from rotation are effectively ignored. Therefore, any orientation of the image results in the same magnitude FFT, and therefore the FRIOU metric is not sensitive to the orientation of images.

At 312, the method 300 includes generating a histogram of the magnitudes (e.g., absolute values) of the frequency components within the frequency ring. For each frequency $f$, the frequency components within the frequency ring corresponding to $f$ may be counted within one of a plurality of histogram bins, which may be defined beforehand (e.g., obtained at 206). For example, a collection of bins may be indexed such that the histogram is given by $H=\{m_i: 0 \le i < M\}$, where M is the number of bins in the histogram, i is the index variable, and $m_i$ is the ith bin, corresponding to the ith magnitude. Each $m_i$ is therefore an integer, representing the number of frequency components with the ith magnitude. In some examples, the bins may be evenly spaced, e.g., each bin $m_i$ represents an equal range of magnitudes. None of the bins may overlap (e.g., the bins may each comprise discrete ranges of magnitudes), at least in some examples.

At 314, the method 300 includes normalizing the histogram. Normalizing the histogram comprises computing the sum of all bins within the histogram corresponding to the frequency $f$ and dividing each bin of the histogram by the sum. Given a histogram H, the normalized histogram NH is given by the equation:

$$NH = \left\{ \frac{m_i}{S}: 0 \le i < M \right\}, \text{ where } S = \sum_{i=0}^{M-1} m_i.$$

The normalized histogram for the image is saved in memory, allowing it to be accessed to determine the FRIOU metric, as described below with respect to FIG. 4. The normalized histogram comprises a WFRMH. The method 300 may then return.

Figure 4:
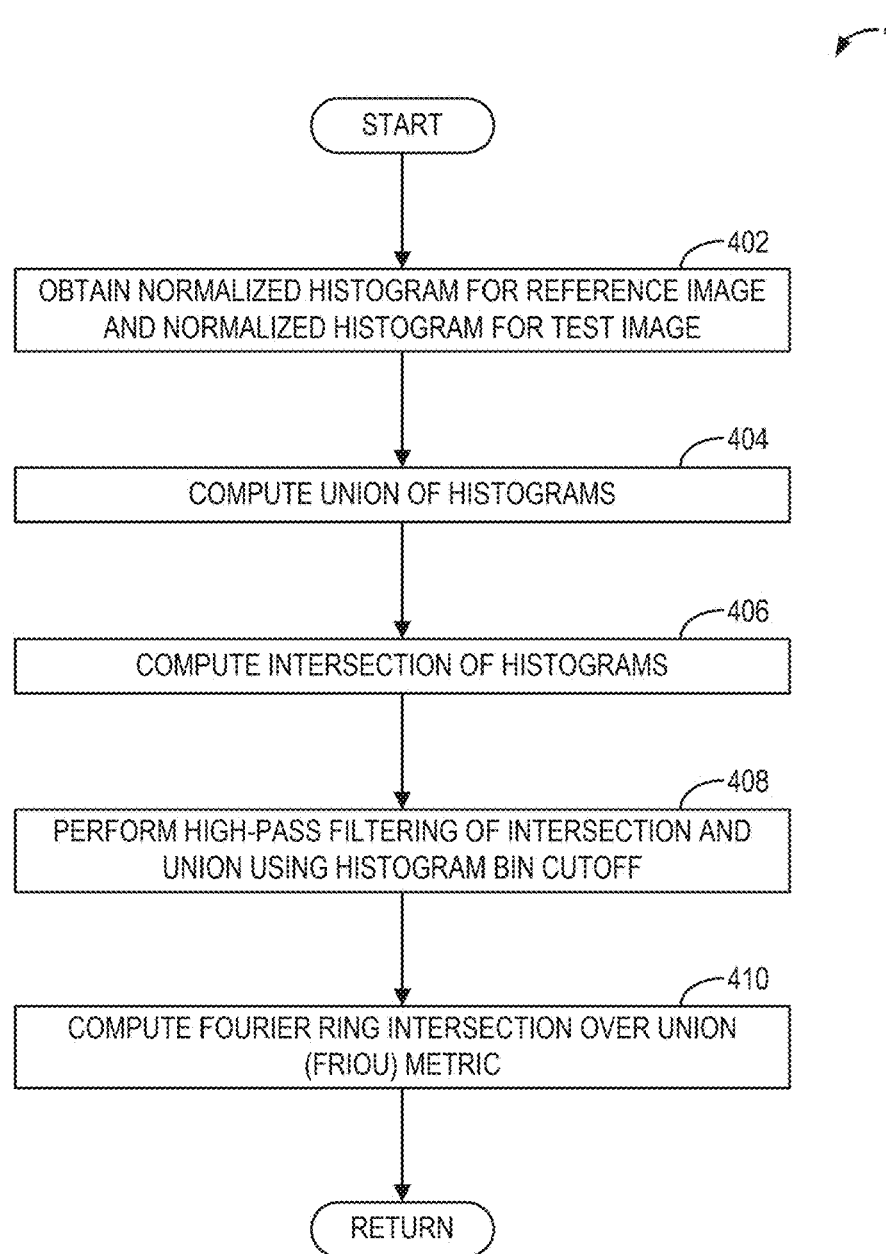
FIG. 4 shows a flow-chart of an example method for computing the FRIOU metric.

Continuing now to FIG. 4, a method 400 for computing a Fourier ring intersection over union (FRIOU) metric is shown. In one embodiment, the method 400 is performed as a part of the method 200 of FIG. 2 (e.g., at 212) and using a normalized histogram generated via the method 300 of FIG. 3. Further, the method 400 may be executed in parallel for a plurality of test images, at least in some examples.

At 402, the method 400 includes obtaining a normalized histogram (e.g., a WFRMH) for a reference image and a normalized histogram for a test image. The normalized histogram for the reference image is compared to the normalized histogram for the test image, as explained in further detail below. The normalized histograms are obtained over the same Fourier ring, are both normalized, and contain the same collection of bins. The histograms for the test and reference images are denoted $NH_{test}=\{m_{test_i}: 0 \le i < M\}$ and $NH_{ref}=\{m_{ref_i}: 0 \le i < M\}$, respectively.

At 404, the method 400 includes computing a union of the two histograms. The union is also a histogram, defined in terms of the bins of the histograms for the test image and the reference image as:

$$U = \{m_{U_i} : 0 \leq i < M\},$$

where $m_{U_i} = \max\{m_{test_i}, m_{ref_i}\}$.

At 406, the method 400 includes computing an intersection of the two histograms. The intersection is also a histogram, defined in terms of the bins of the histograms for the test image and the reference image as:

$$I = \{m_{I_i} : 0 \leq i < M\},$$

where $m_{I_i} = \min\{m_{test_i}, m_{ref_i}\}$.

At 408, the method 400 includes performing high-pass filtering on the intersection and union using a histogram bin cutoff. The histogram bin cutoff is a histogram bin below which the spectral content of the histograms should be disregarded, as explained in further detail above at 210 of FIG. 2. The histogram bin cutoff may be expressed as an index $b_0$ satisfying $0 \leq b_0 < M$. High-pass filtering of the intersection and union comprises finding histograms $U_+$ and $I_+$, defined by the equations:

$$U_+ = \{m_{U_i} : b_0 \leq i < M\};$$
$$I_+ = \{m_{I_i} : b_0 \leq i < M\}.$$

At 410, the method 400 includes computing the FRIOU metric. The FRIOU metric is obtained by dividing the sum of all bins in the high-pass intersection histogram by the sum of all bins in the high-pass union histogram according to the equation:

$$FRIOU = \frac{\sum I_+}{\sum U_+} = \frac{\sum_{i=b_0}^{M-1} m_{I_i}}{\sum_{i=b_0}^{M-1} m_{U_i}}.$$

As described above with respect to FIG. 2, the FRIOU metric denotes a degree of similarity between the test image and the reference image and ranges from 0.0 (no similarity) to 1.0 (maximum similarity). Thus, the FRIOU metric may be used to determine how closely the test image resembles a desired characteristic of the reference image, such as image quality or cell morphology. The FRIOU metric may be saved, such in the memory of the computing device, and/or displayed to the user as a means to gauge the quality of the image, such as described above with respect to 216 of FIG. 2. The method 400 may then return.

Figure 5:
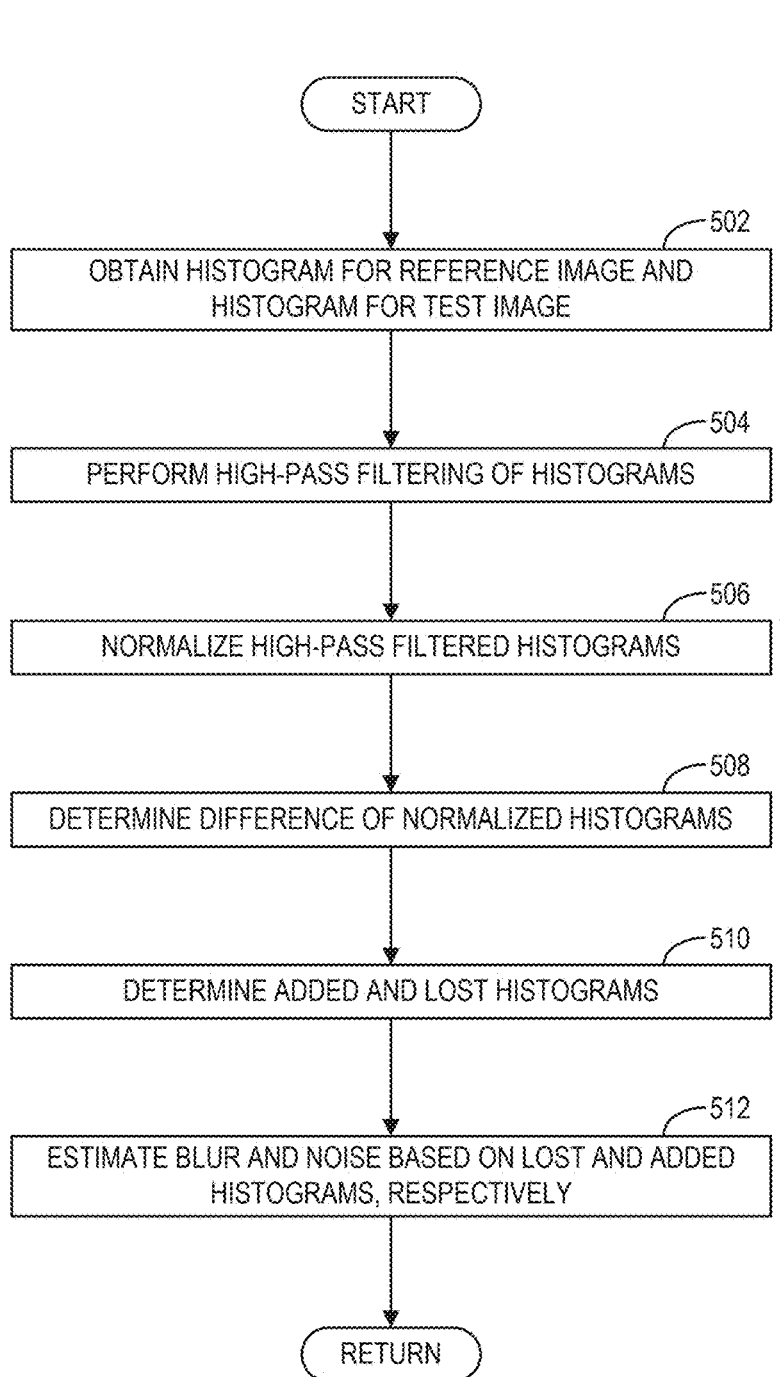
FIG. 5 shows a flow-chart of an example method for computing blur and noise.

Next, FIG. 5 shows a method 500 for computing blur and noise. In one embodiment, the method 500 is performed as a part of the method 200 of FIG. 2 (e.g., at 214). Further, it may be understood that the method 500 may be executed in parallel for a plurality of test images.

At 502, the method 500 includes obtaining a histogram for the reference image and a histogram for the test image. Histograms from each of the reference image and the test image may be obtained, for example, by executing the method 300 of FIG. 3 for each of the reference image and the test image. The histograms may comprise normalized histograms (e.g., WFRMHs), at least in some examples. The histogram for the test image is denoted $NH_{test} = \{m_{test_i} : 0 \leq i < M\}$, and the histogram for the reference image is denoted $NH_{ref} = \{m_{ref_i} : 0 \leq i < M\}$.

At 504, the method 500 includes performing high-pass filtering of the histograms. Performing high-pass filtering of the histograms is performed in a similar way to the high-pass filtering performed on the intersection and union histograms at 408. However, a parameter $b_1$ may indicate the first histogram bin used for blur and noise estimates, different than the parameter $b_0$ used for the FRIOU metric. Typically, $b_1$ is a higher index value than $b_0$ used for the FRIOU metric. As an illustrative example where $b_0$ is 10, $b_1$ is 20. For example, the high-pass test histogram $H_{test+}$ and the high-pass reference histogram $H_{ref+}$ may be given by the equations:

$$H_{test+} = \{m_{test_i} : b_1 \leq i < M\};$$

$$H_{ref+} = \{m_{ref_i} : b_1 \leq i < M\}.$$

Note that the high-pass histograms may not be normalized given by the above equations may not be normalized.

At 506, the method 500 includes normalizing the high-pass filtered histograms. The high-pass histograms $NH_{test+}$ (corresponding to the normalized high-pass test histogram) and $NH_{ref+}$ (corresponding to the normalized high-pass reference histogram) may each be normalized by dividing each histogram by its sum:

$$NH_{test+} = \left\{ \frac{m_{test_i}}{S_{test}} : b_1 \leq i < M \right\};$$

$$NH_{ref} = \left\{ \frac{m_{ref}}{S_{ref}} : b_1 \leq i < M \right\},$$

where $S_{test} = \sum_{i=b_1}^{M-1} m_{test_i}$ and $S_{ref} = \sum_{i=b_1}^{M-1} m_{ref_i}$.

At 508, the method 500 includes determining the difference of the normalized high-pass histograms. The difference results in a difference histogram $D = \{d_i : b_1 \leq i < M\}$, where $d_i$ is the $i_{th}$ bin. The ith bin of the difference histogram is computed by taking the bin-wise difference of the normalized high-pass histograms obtained at 508 according to the equation:

$$d_i = \frac{m_{test_i}}{S_{test}} - \frac{m_{ref_i}}{S_{ref}}.$$

At 510, the method 500 includes determining added and lost histograms. The added histogram represents bins of the difference histogram greater than 0 and the lost histogram represents bins of the difference histogram less than 0. The added and lost histograms may be determined by computing a collection of added indices A and a collection of lost indices L. The added and lost indices may be defined according to the following equations:

$$A = \{\alpha: b_1 \leq \alpha < M, d_\alpha > 0\};$$

$$L = \{\ell: b_1 \leq \ell < M, d_\ell < 0\}.$$

The added histogram $H_A$ and the lost histogram $H_L$, defined in terms of the above indices, are the histograms defined according to the following equations:

$$H_A = \{d_\alpha: \alpha \in A\};$$

$$H_L = \{d_\ell: \ell \in L\}.$$

At 512, the method 500 includes estimate the blur and the noise based on the lost and added histograms, respectively. A blur value (BLUR) may be determined from the equation:

$$\text{BLUR} = \left| \sum H_L \right| = \left| \sum_{\ell \in L} d_\ell \right|.$$

The absolute value is taken after performing the sum because the values of $d_\ell$ are negative for all $\ell \in L$ by definition. A noise value (NOISE) may be computed by performing a similar sum using the added histogram using the equation:

$$\text{NOISE} = \sum H_A = \sum_{a \in A} d_a.$$

Since all $d_a$ are positive for the added histogram, the absolute value is not taken. The blur value and the noise value may be each saved, such in the memory of the computing device, and/or displayed to the user as a means to gauge the quality of the image, such as described above with respect to 216 of FIG. 2. The method 500 may then return.

Next, FIG. 7 shows a method 700 for classifying cells within an image based on the FRIOU metric, according to an embodiment. The method 700 may be executed by a processor of a computing system, such as the processor 112 of the computing system 100 of FIG. 1, according to instructions stored in a non-transitory memory of the computing system (e.g., within the image processing module 118 of the memory 114 of FIG. 1). The method 700 may be executed in combination with at least parts of the methods described above with respect to FIGS. 2-5. For example, the method 700 may be particularly applicable to bioassays.

At 702, the method 700 includes receiving one or more test images of cells and one or more reference images. The test image(s) and the reference image(s) may be generated as described above with respect to 202 and 204 of FIG. 2, such as using any cell imaging technique. In some examples, a user may select the reference image(s) or a plurality of candidate reference images. Similarly, the user may select the test image(s) to be evaluated via the FRIOU metric via the method 700. Each reference image may visually represent one or more desired qualities (or characteristics) for the test image(s) to be evaluated against.

Further, images (both test images and reference images) with a plurality of objects of interest (such as cells) may be divided into sub-images that may be used for object classification such that each object (e.g., cell) is individually evaluated according to the method described below. Alternatively, the original images of the plurality of objects may be evaluated to make ensemble similarity measurements to evaluate an overall similarity of the test image relative to the reference image, similar to the example of image quality described with respect to FIG. 2. For example, the method 700 may be used to evaluate the overall similarity of a plurality of cells in a test image compared with a plurality of cells in a reference image, or the method may be used to individually evaluate the similarity of a plurality of sub-images of a single cell relative to a single reference cell of a reference image.

At 704, the method 700 includes receiving a selection of a feature to be evaluated via the FRIOU metric. The feature may be selected from a plurality of possible features that may be generally divided into classification features and similarity features. The classification features may be used to quantify cells exhibiting the selected feature, whereas the similarity features may be used to quantify a relative degree of the selected feature that is present in the cells. The classification features may include, for example, a type of cell, a number of cells having a desired size, and a number of infected cells. The similarity features may include, for example, cell degradation, cell health (wherein there is a lack of cell degradation), and cell morphology. As an example where the selected feature is cell health, the reference image may include one or more nominal, healthy cells free from infection and degradation. As such, low FRIOU metric values for cell health may identify cells having a wide range of pathologies based on changes in the image features. In some examples, the feature may be selected via user input, such as received via a user interface (e.g., the user interface 102 of FIG. 1). In other examples, the feature may be selected according to a protocol selected by the user.

The features may further include one-hot classification encoding. For example, the method 700 may automatically select the feature with the highest respective FRIOU metric for a selected reference image. In one example, the method 700 may identify the feature because it may be known that the corresponding reference image depicts the feature, such as due to tags that may be assigned by a user or via machine learning-based classification.

At 706, the method 700 includes determining the FRIOU metric for each test image relative to the reference image(s), as described above with respect to FIG. 4. The FRIOU metric may be separately determined for each test image or for a set of test images comprising multiple images from different locations within a single well of a bioassay, different wells having a same treatment condition, and the like. The set approach allows for multiple references and multiple test images to be used for a wider set of metrics and comparisons. For example, to determine how different images are from each other across a well, a plate, or a group of plates, all images' respective Fourier ring weighted histograms can be used in the intersection and union calculation.

At 708, the method 700 includes determining if a classification feature is the selected feature for evaluation via the FRIOU metric (e.g., as selected at 704). If the selected feature is a classification feature, the method 700 proceeds to 710 and includes quantifying cells in each test that have the selected feature based on the FRIOU metric relative to a threshold. The threshold refers to a pre-determined, non-zero value that distinguishes cells that have selected features from cells that do not have the selected feature. As a non-limiting example, the threshold may be 0.6. However, in other examples, the threshold may be higher (e.g., 0.8) or lower (e.g., 0.5). The threshold may be pre-determined according to the selected feature and/or adjusted by the user.

At 714, the method 700 includes outputting results of the FRIOU metric analysis. For example, a report indicating the quantity (e.g., number) of cells in each test image that have the selected feature. As an illustrative example where the selected feature is viral infection, the report may indicate the total number and/or percentage of cells infected with the virus in the test image(s). The results may be output to a display device (e.g., the display device 104 of FIG. 1) and/or saved to memory. The method 700 may then return.

Returning to 708, if the selected feature is not a classification feature (e.g., the selected feature is a similarity feature), the method 700 proceeds to 712 and includes determining a degree of similarity of the test image with the selected feature directly from the FRIOU metric. As such, the FRIOU metric may provide a quantitative measure of the degree to which each cell in the test image exhibits the selected feature.

As mentioned above, at 714, the method 700 includes outputting the results of the FRIOU metric analysis. As an illustrative example where the selected feature is cell degradation, the report may indicate a relative change in the amount of cell degradation at different treatment concentrations of a compound. The method 700 may then return.

FIG. 8 shows two images: a first image 800 and a second image 850. The first image 800 has a high value for the FRIOU metric and low values for blur and noise. The second image 850 has a low value for the FRIOU and high values for the blur and noise. Thus, the first image 800 has higher image quality, whereas the second image 850 has low image quality.

FIG. 9 shows and example plot 900 comparing two cell counting methods performed on a plurality of images of cells and the corresponding FRIOU metric value associated with each image. The vertical axis shows the number of cells counted from the images using a first cell counting method (e.g., "cell counting method 1"), and the horizontal axis shows the number of cells counted from the images using a second cell counting method (e.g., "cell counting method 2"). Each symbol on the plot 900 represents the number of cells counted for a same image by both cell counting methods. The plot 900 also includes a legend 902. As indicated by the legend 902, circular symbols represent images having a FRIOU metric value that is greater than or equal to 0.6, and X-shaped symbols represent images having a FRIOU metric value that is less than 0.6. The FRIOU metric value of 0.6 may be a threshold that distinguishes higher quality images from lower quality images.

As shown in plot 900, a majority of the images having high image quality (e.g., FRIOU values greater than or equal to 0.6) result in the same or similar cell counts using the first cell counting method and the second cell counting method, resulting in a diagonally oriented trend. The lower quality images result in more variable cell counts using the first cell counting method and the second cell counting method. For example, the second cell counting method is more sensitive to image degradation due to blur, such as shown by a point 904 where the second cell counting method resulted in substantially fewer cells than the first cell counting method (e.g., undercounting). As another example, the second cell counting method is more sensitive to image degradation due to noise, such as shown by a point 906 where the second cell counting method counted substantially more cells than the first cell counting method (e.g., overcounting).

The first cell counting method uses the FRIOU metric for classifying cells and counting the cells having a desired classification. For example, the first cell counting method may first use the FRIOU metric to identify cells of the desired classification and then quantify the cells having the desired classification. In contrast, the second cell counting method may use machine learning or hand-crafted features from other methods, such as those derived from segmentation (e.g., from watershed algorithms), to identify cells having the desired classification, which may have decreased accuracy compared to the FRIOU metric in addition to the increased sensitivity to poor image quality. Note that the FRIOU metric may be used to assess the image quality prior to the cell classification, and if the quality is below a selected threshold, the image may be optionally omitted from further analysis via the first cell counting method to decrease computation time.

In this way, the FRIOU metric may be used to determine a degree of similarity between a test image and a reference image, which may be further related to image quality or another selected characteristic. The FRIOU metric may be determined in real-time (e.g., a fraction of a second per test image) due to its relative computational efficiency and is less sensitive to outliers than current image quality assessment methods, including FRC. Further, the FRIOU method may be used to quickly evaluate large datasets, including bioassay datasets, to determine how similar or different images are from each other. As such, the FRIOU metric may be usable to identify bioassay hits, expected versus anomalous results, and the like.

The technical effect of determining a Fourier ring intersection over union metric for a set of images is that a degree of similarity between the images may be output in real-time.

The disclosure also provides support for a method, comprising: outputting a metric indicating a degree of similarity between a test image and a reference image for a selected characteristic based on an intersection over union calculation applied to spatial frequency domain transforms of the test image and the reference image. In a first example of the method, the selected characteristic comprises image quality. In a second example of the method, optionally including the first example, test image and the reference image comprise images of cells in a bioassay. In a third example of the method, optionally including one or both of the first and second examples, the selected characteristic comprises a cell count. In a fourth example of the method, optionally including one or more or each of the first through third examples, the selected characteristic comprises a cell morphology. In a fifth example of the method, optionally including one or more or each of the first through fourth examples, the selected characteristic comprises cell health, and wherein the reference image depicts one or more healthy cells. In a sixth example of the method, optionally including one or more or each of the first through fifth examples, the method further comprises: performing the intersection over union calculation on the spatial frequency domain transforms of the test image and the reference image. In a seventh example of the method, optionally including one or more or each of the first through sixth examples, performing the intersection over union calculation on the spatial frequency domain transforms of the test image and the reference image comprises: obtaining coordinates for frequency rings in the spatial frequency domain transforms of the test image and the reference image, and calculating and normalizing a first weighted Fourier transform ring magnitude histogram for the frequency rings of the test image and a second weighted Fourier transform ring magnitude histogram for the frequency rings of the reference image. In an eighth example of the method, optionally including one or more or each of the first through seventh examples, the method further comprises: computing a union of the first weighted Fourier transform ring magnitude histogram and the second weighted Fourier transform ring magnitude histogram, computing an intersection of the first weighted Fourier transform ring magnitude histogram and the second weighted Fourier transform ring magnitude histogram, and filtering the intersection and the union using a histogram bin cutoff.

The disclosure also provides support for a system, comprising: a computing device including a processor configured to execute instructions stored in non-transitory memory that, when executed, cause the processor to: receive an image of a bioassay and a reference image for evaluating a selected characteristic of the image of the bioassay, and output a degree of similarity between the image of the bioassay and the reference image for the selected characteristic based on an intersection over union calculation applied to a magnitude Fourier ring histogram pair determined for the image of the bioassay and the reference image. In a first example of the system, the system further comprises: an imager communicatively coupled to the computing device, and wherein the computing device receives the image of the bioassay from the imager. In a second example of the system, optionally including the first example, the non-transitory memory includes further instructions that, when executed by the processor, cause the processor to: select the reference image from a plurality of candidate reference images based on the degree of similarity between each of the candidate reference images with respect to each other, wherein the selected reference image has a highest degree of similarity. In a third example of the system, optionally including one or both of the first and second examples, the selected characteristic comprises one or more of an image quality, a cell count, and a cell feature. In a fourth example of the system, optionally including one or more or each of the first through third examples, the cell feature comprises at least one of a cell morphology, a cell size, cell health, and cell degradation.

The disclosure also provides support for a method, comprising: quantifying a feature of cells in a bioassay based on a Fourier ring intersection over union (FRIOU) metric determined for images of the bioassay relative to reference images. In a first example of the method, the feature comprises a number of cells having the FRIOU metric greater than a pre-determined threshold. In a second example of the method, optionally including the first example, the feature comprises a relative change with respect to a treatment condition of the bioassay. In a third example of the method, optionally including one or both of the first and second examples, the feature comprises a percentage of cells infected via an infectious agent used in the bioassay. In a fourth example of the method, optionally including one or more or each of the first through third examples, the feature determined based on a highest FRIOU metric between the images of the bioassay and a reference image depicting the feature. In a fifth example of the method, optionally including one or more or each of the first through fourth examples, the FRIOU metric indicates a degree of similarity for a given image of the bioassay relative to a given reference image.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of assessing bioassay image quality, comprising:
   performing a two-dimensional (2D) fast Fourier transform of a test image and a reference image to obtain spatial frequency domain transforms of the test image and the reference image;
   obtaining coordinates for frequency rings in the spatial frequency domain transforms of the test image and the reference image;
   calculating and normalizing a first weighted Fourier ring magnitude histogram for the frequency rings of the test image and a second weighted Fourier ring magnitude histogram for the frequency rings of the reference image;
   computing a union of the first weighted Fourier ring magnitude histogram and the second weighted Fourier ring magnitude histogram and an intersection of the first weighted Fourier ring magnitude histogram and the second weighted Fourier ring magnitude histogram;
   filtering the intersection and the union using a histogram bin cutoff to obtain a high-pass filtered intersection and a high-pass filtered union; and
   outputting a metric indicating a degree of similarity between the test image and the reference image for a selected characteristic based on dividing a sum of all bins in the high-pass filtered intersection by a sum of all bins in the high-pass filtered union.

2. The method of claim 1, wherein the selected characteristic comprises image quality.

3. The method of claim 1, wherein test image and the reference image comprise images of cells in a bioassay.

4. The method of claim 3, wherein the selected characteristic comprises a cell count.

5. The method of claim 3, wherein the selected characteristic comprises a cell morphology.

6. The method of claim 3, wherein the selected characteristic comprises cell health, and wherein the reference image depicts one or more healthy cells.

7. A system, comprising:
   a computing device including a processor configured to execute instructions stored in non-transitory memory that, when executed, cause the processor to:
      receive an image of a bioassay and a reference image for evaluating a selected characteristic of the image of the bioassay;

perform a two-dimensional (2D) fast Fourier transform of the image of the bioassay and the reference image to obtain spatial frequency domain transforms of the image of the bioassay and the reference image;

obtain coordinates for frequency rings in the spatial frequency domain transforms of the image of the bioassay and the reference image;

calculate and normalize a first weighted Fourier ring magnitude histogram for the frequency rings of the image of the bioassay and a second weighted Fourier ring magnitude histogram for the frequency rings of the reference image;

compute a union of the first weighted Fourier ring magnitude histogram and the second weighted Fourier ring magnitude histogram and an intersection of the first weighted Fourier ring magnitude histogram and the second weighted Fourier ring magnitude histogram;

filter the intersection and the union using a histogram bin cutoff to obtain a high-pass filtered intersection and a high-pass filtered union; and output a degree of similarity between the image of the bioassay and the reference image for the selected characteristic based on dividing a sum of all bins in the high-pass filtered intersection by a sum of all bins in the high-pass filtered union.

8. The system of claim 7, further comprising an imager communicatively coupled to the computing device, and wherein the computing device receives the image of the bioassay from the imager.

9. The system of claim 8, wherein the non-transitory memory includes further instructions that, when executed by the processor, cause the processor to:

select the reference image from a plurality of candidate reference images based on the degree of similarity between each of the plurality of candidate reference images with respect to each other, wherein the reference image has a highest degree of similarity.

10. The system of any one of claim 9, wherein the selected characteristic comprises one or more of an image quality, a cell count, and a cell feature.

11. The system of claim 9, wherein the selected characteristic comprises a cell feature, and wherein the cell feature comprises at least one of a cell morphology, a cell size, cell health, and cell degradation.

12. A method, comprising:

performing a two-dimensional (2D) fast Fourier transform of images of the bioassay and reference images to obtain spatial frequency domain transforms of the images of the bioassay and the reference images;

obtaining coordinates for frequency rings in the spatial frequency domain transforms of the images of the bioassay and the reference images;

calculating and normalizing a first weighted Fourier ring magnitude histogram for the frequency rings of each image of the bioassay and a second weighted Fourier ring magnitude histogram for the frequency rings of each reference image;

computing a union of the first weighted Fourier ring magnitude histogram and the second weighted Fourier ring magnitude histogram and an intersection of the first weighted Fourier ring magnitude histogram and the second weighted Fourier ring magnitude histogram;

filtering the intersection and the union using a histogram bin cutoff to obtain a high-pass filtered intersection and a high-pass filtered union;

determining a Fourier ring intersection over union (FRIOU) metric for the images of the bioassay relative to the reference images by dividing a sum of all bins in the high-pass filtered intersection by a sum of all bins in the high-pass filtered union; and quantifying the feature of cells in the bioassay based on the FRIOU metric.

13. The method of claim 12, wherein the feature comprises a number of cells having the FRIOU metric greater than a pre-determined threshold.

14. The method of claim 12, wherein the feature comprises a relative change with respect to a treatment condition of the bioassay.

15. The method of claim 12, wherein the feature comprises a percentage of cells infected via an infectious agent used in the bioassay.

16. The method of claim 12, wherein the feature determined based on a highest FRIOU metric between the images of the bioassay and a reference image depicting the feature.

17. The method of claim 12, wherein the FRIOU metric indicates a degree of similarity for a given image of the bioassay relative to a given reference image.

* * * * *